US011787737B2

(12) United States Patent
Grosso et al.

(10) Patent No.: US 11,787,737 B2
(45) Date of Patent: Oct. 17, 2023

(54) PROCESS FOR COMPOSITE BLOCK THINSET, GROUT, AND SELF-LEVELING UNDERLAYMENT MATERIAL

(71) Applicant: LATICRETE INTERNATIONAL, INC., Bethany, CT (US)

(72) Inventors: Stephen R. Grosso, Trophy Club, TX (US); Peter T. Wickenheisser, Cheshire, CT (US); Paul J. Magda, Southbury, CT (US)

(73) Assignee: Laticrete International, Inc., Bethany, CT (US)

( * ) Notice: Subject to any disclaimer, the term of this patent is extended or adjusted under 35 U.S.C. 154(b) by 902 days.

(21) Appl. No.: 16/571,917

(22) Filed: Sep. 16, 2019

(65) Prior Publication Data

US 2020/0087203 A1    Mar. 19, 2020

Related U.S. Application Data

(60) Provisional application No. 62/731,522, filed on Sep. 14, 2018.

(51) Int. Cl.
*B28B 3/12* (2006.01)
*B28C 7/02* (2006.01)
*C04B 40/00* (2006.01)
*C04B 14/06* (2006.01)
*C04B 18/08* (2006.01)
(Continued)

(52) U.S. Cl.
CPC .......... *C04B 14/06* (2013.01); *B28B 3/12* (2013.01); *B28C 7/02* (2013.01); *C04B 18/08* (2013.01); *C04B 24/2623* (2013.01); *C04B 28/02* (2013.01); *C04B 40/0028* (2013.01)

(58) Field of Classification Search
CPC ..... C04B 14/06; C04B 18/08; C04B 24/2623; C04B 28/02; C04B 40/0028; C04B 18/028; C04B 40/0039; C04B 7/525; B28B 3/12; B28B 3/14; B28C 7/02; Y02W 30/91

See application file for complete search history.

(56) References Cited

U.S. PATENT DOCUMENTS

| 5,580,409 | A  | * | 12/1996 | Andersen | ............... | B29C 55/18 |
|           |    |   |         |          |                 | 264/133    |
| 6,692,544 | B1 | * | 2/2004  | Grillenzoni | ............ | C10L 5/361 |
|           |    |   |         |          |                 | 44/589     |

(Continued)

FOREIGN PATENT DOCUMENTS

EP           0813261 A2 *  12/1997  ............. C04B 14/02

*Primary Examiner* — Jacob T Minskey
*Assistant Examiner* — Caroline Beha
(74) *Attorney, Agent, or Firm* — DeLio Peterson & Curcio LLC; Kelly M. Nowak

(57) ABSTRACT

Methods of forming composite block briquettes of prefabricated thinsets, grouts, and self-leveling underlayment products having high sand content, and the resultant composite block briquettes. Processing conditions within a compacting tool are controlled to generate a press force that is applied to a prefabricated cementitious product having a high sand content, whereby the press force enables formation of sustainable prefabricated product briquettes having a high sand content. The controlled compacting processing conditions and parameters of the invention generate usable briquettes that break up and form the intended resultant product of the starting prefabricated cementitious product.

18 Claims, 4 Drawing Sheets

(51) Int. Cl.
*C04B 24/26* (2006.01)
*C04B 28/02* (2006.01)

(56) References Cited

U.S. PATENT DOCUMENTS

| | | | |
|---|---|---|---|
| 2004/0044103 A1* | 3/2004 | Rooshenas | C04B 28/02 |
| | | | 524/2 |
| 2005/0050996 A1* | 3/2005 | Gannon | C22B 1/24 |
| | | | 75/751 |
| 2005/0187605 A1* | 8/2005 | Greenhalgh | A61F 2/07 |
| | | | 264/516 |
| 2015/0018459 A1* | 1/2015 | Huang | C08C 2/02 |
| | | | 524/13 |

* cited by examiner

| Test No. | Batch/Test Material | Hydraulic pressure [bar] | Roller Amperage [A] | Roller Torque [Nm] | Feeder Screw speed [1/min] | Feeder Screw Amperage [A] | Feeder Screw Torque [Nm] | Generated Press force on Prefabricate Product [kN] |
|---|---|---|---|---|---|---|---|---|
| 1 | Batch 1 | 70 | 2 x 3.8 | 2 x 5.8 | 21 | 2.9 | 2.3 | 140 |
| 1b | Batch 1 | 70 | 2 x 3.5 | 2 x 5.5 | 22 | 3.0 | 2.4 | 125 - 130 |
| 2 | Batch 2 | 70 | 2 x 3.5 | 2 x 5.5 | 21.5 | 2.9 | 2.0 | 125 - 130 |
| 3 | Batch 3 | 70 | 2 x 3.5 | 2 x 5.5 | 20 | 2.9 | 1.9 | 130 |
| 4a | Batch 4 | 70 | 2 x 3.5 | 2 x 5.4 | 17 | 2.9 | 2.1 | 118 |
| 4b | Batch 4 | 70 | 2 x 3.5 | 2 x 5.4 | 17 | 2.9 | 2.1 | 125 |
| 5 | Batch 5 | 70 | 2 x 3.4 | 2 x 5.1 | 19.5 | 2.9 | 2.0 | 130 |
| 6 | Batch 6 253 Thinset + PVA and Dust Free Oil | 70 | 2 x 3.4 | 2 x 5.1 | 19.5 | 3.0 | 2.6 | 130 |
| 7 | Batch 7 | 70 | 2 x 3.3 | 2 x 5.1 | 31 | 2.9 | 2.1 | 145-150 |
| 7b | Batch 7 | 85 | 2 x 3.5 | 2x15.8 | 34-37 | 2.9 | 1.9 | 180-190 |
| 8 | Batch 8 | 85 | 2 x 3.4 | 2 x 4.6 | 19 | 2.9 | 2.1 | 140-150 |
| 9 | Batch 9 | 85 | 2 x 3.4 | 2 x 4.5 | 16 | 2.9 | 2.1 | 120 |
| 10 | Batch 10 Drytek 4111 + Dust Free Oil | 85 | 2 x 3.3 | 2 x 4.5 | 17.5 | 2.9 | 2.2 | 130-135 |
| 11 | Batch 11 Permacolor select | 85 | 2 x 3.1 | 2 x 2.9 | 30 | 2.9 | 1.7 | 140 |
| 12 | Batch 12 Permacolor + Dust Free Oil | 85 | 2 x 3.1 | 2 x 2.1 | 18 | 2.9 | 1.7 | 150 |
| 13 | Batch 13 254 Platinum | 85 | 2 x 3.3 | 2 x 3.5 | 20 | 2.9 | 1.7 | 60-70 |
| 14 | Batch 14 | 85 | 2 x 3.3 | 2 x 3.5 | 16 | 2.9 | 1.4 | 50-60 |
| 15 | Batch 15 254 Thinset | 85 | 2 x 3.3 | 2 x 4.3 | 17 | 2.9 | 1.4 | 70 |

FIG. 6

PROCESS FOR COMPOSITE BLOCK THINSET, GROUT, AND SELF-LEVELING UNDERLAYMENT MATERIAL

BACKGROUND OF THE INVENTION

1. Field of the Invention

The present invention relates to briquetting, and in particular, to processes of generating and briquettes formed of thinsets, grouts, and/or self-leveling underlayments.

2. Description of Related Art

Cementitious or cement-based materials are often used to formulate thinsets, grouts, and self-leveling underlayment products for use in tiling. Typically, known cementitious or cement-based materials are provided in powder form which is difficult to handle, causes undesired dust particles, and is susceptible to transport and use difficulties. Fine powdered cements are further known to pack under their own weight when stored in large quantities, as well as become lumpy while in storage, both of which make powdered cements difficult to use and handle.

In addressing the issues associated with powder cement-based materials, prior art has been directed to forming such materials into granules or pellets. For instance, prior art teaches forming powdered cement into granules or pellets by cementing together a number of particles to form a group or aggregation of particles having sizes of 100 mesh. These granules or pellets are formed by adding a water dissolvable bonding agent in solvent to the powdered cement to form a weak bond that holds the powdered cement together. However, since these granules or pellets have a weak bond and are kept to a small size for ease of dissolving, such smaller sized granules or pellets breakdown easily during normal handling operations (e.g., during transport, storage, pouring, use, and the like). Further, after the pellets are formed, such pellets are heated to evaporate the solvent from the binder, whereby some of such solvent remains. This undesirably affects the properties and characters of the resultant cement and cement product.

Other approaches of aggregating or briquetting powdered cement include adding a binder material in the presence of water or a liquid stabilizing agent, whereby the binder material, water, and/or liquid stabilizing agent must be dried off using a heater and dry step prior to aggregation. The addition of liquid stabilizing agents or the binder in water and added dry steps increase both processing time and expenses, as well as add chemical constituents within the cement-based material that may deleteriously affect the resultant product. The process of drying the cement material after the addition of binder in water may also lead to increased brittleness of the cement aggregation due to over-drying, particularly in the presence of heat.

However, it has been found that known approaches of aggregating cementitious materials are inadequate and unsuitable for use in briquetting prefabricated products that have a cement/cement-based material in combination with high amounts of sand. For instance, known aggregating/briquetting processes are inadequate and unsuitable for briquetting prefabricated thinset, grout, and self-leveling underlayment products that are suitable for use in flooring and tiling.

Accordingly, there continues to be a need for new and improved approaches of aggregating or briquetting prefabricated products without changing the properties, characteristics, and performance thereof, for which the present invention provides a solution thereto.

BRIEF SUMMARY OF THE INVENTION

The disclosed embodiments of the various inventive features relate to methods of forming prefabricated product composite blocks by providing a compacting tool having a feeder screw and drum rollers, and feeding a sanded prefabricated cementitious product into the compacting tool. The method includes controlling feeder screw speed of the feeder screw, roller speed of the drum rollers, and a pressure of the drum rollers within the compacting tool to generate a press force that enables compaction of the sanded prefabricated cementitious product. The sanded prefabricated cementitious product is compacted using the drum rollers and the press force to form sanded prefabricated cementitious composite block briquettes.

In one or more embodiments the sanded prefabricated cementitious product may be a prefabricated formulation in a loose powdered state. The feeder screw may be a cylindrical feeder screw. The sanded prefabricated cementitious product is compacted as-is without adding any additional ingredients thereto. The generated press force may range from 50 1th to 200 kN.

In other embodiments of the invention, the sanded prefabricated cementitious product may be 24 wt. %-80 wt. % sand, based on a total weight of the sanded prefabricated cementitious product. In these embodiments, the sanded prefabricated cementitious product may be a prefabricated thinset containing 25 wt. %-70 wt. % sand, preferably 40 wt. %-55 wt. % sand, based on a total weight of the prefabricated thinset. The sanded prefabricated cementitious product may also be a prefabricated grout containing 30 wt. %-80 wt. % sand, preferably 50 wt. %-65 wt. % sand, based on a total weight of the prefabricated grout. Still further, the sanded prefabricated cementitious product may be a prefabricated self-leveling underlayment containing 24 wt. %-74 wt. % sand, preferably 39 wt. %-55 wt. % sand, based on a total weight of the prefabricated self-leveling underlayment.

In still other embodiments the sanded prefabricated cementitious product may comprise 24 wt. %-80 wt. % sand, 9 wt. % to 49 wt. % cementitious material, 0 wt. % to 9 wt. % fly ash, 0 wt. % to 5 wt. % PVA powder, and 0 wt. % to 3 wt. % dust free oil, wherein all weight % is based on a total weight of the sanded prefabricated cementitious product. The pressure of the drum rollers may range from 500 PSI to 15,000 PSI, preferably from 1,500 PSI to 2,250 PSI in accordance with one or more embodiments.

In further embodiments, the invention is directed to method of forming a prefabricated product composite block by providing a compacting tool having a cylindrical feeder screw and drum rollers, and feeding a prefabricated thinset, grout, or self-leveling underlayment product into the compacting tool. The feeder screw speed of the feeder screw, roller speed of the drum rollers, and a pressure of the drum rollers within the compacting tool are all controlled to generate a press force that enables formation of composite blocks of the prefabricated thinset, grout, or self-leveling underlayment product. The prefabricated thinset, grout, or self-leveling underlayment product is compacted using the compacting tool and the press force to form prefabricated thinset, grout, or self-leveling underlayment composite block briquettes.

In certain embodiments of the invention, the feeder screw speed may be controlled at rates of 16 rpm to 37 rpm, and the generated press force may range from 50 kN to 200 kN.

The prefabricated thinset, grout, or self-leveling underlayment product may be a prefabricated thinset containing 40 wt. %-55 wt. % sand, based on a total weight of the prefabricated thinset. Alternatively, the prefabricated thinset, grout, or self-leveling underlayment product may be a prefabricated grout containing 50 wt. %-65 wt. % sand, based on a total weight of the prefabricated grout. Still further, the prefabricated thinset, grout, or self-leveling underlayment product may be a prefabricated self-leveling underlayment containing 39 wt. %-55 wt. % sand, based on a total weight of the prefabricated self-leveling underlayment.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 6 illustrates a table showing various prefabricated thinset, grout, and self-leveling underlayment products, and their respective processing parameters in accordance with embodiments of the invention, for generating prefabricated product briquettes of the invention.

DESCRIPTION OF THE PREFERRED EMBODIMENT(S)

Figure 1:
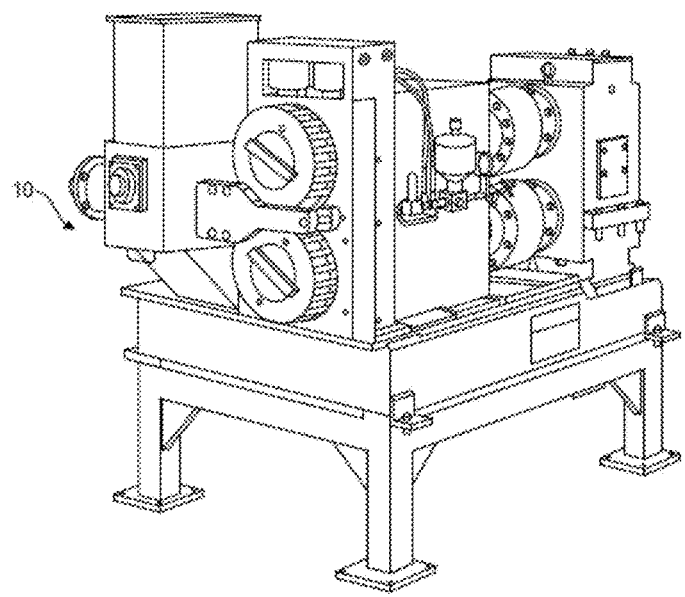
FIG. 1 illustrates a horizontal feed briquette device suitable for use in one or more embodiments of the invention.

In describing the preferred embodiment of the present invention, reference will be made herein to FIGS. 1-6 of the attached drawings, as well as the drawings detailed herein below.

Known approaches of aggregating and/or briquetting cementitious (i.e., cement or cement-based) materials employ the use of adding water, solvents, binders and other agents, and/or combinations thereof. These constituents are added to the cementitious materials to enable compacting and binding of the materials during the aggregation or briquetting processes, and must be removed from the granules, pellets or briquettes at or near the end of such process. It has been found that the addition of water, solvents, binders and other agents, or combinations thereof, to a finished prefabricated product, and in particular, to prefabricated thinsets, grouts, and self-leveling underlayment products deleteriously affects the properties, characteristics, and performance thereof.

As used herein, the term prefabricated product refers to a product that is in a ready-to-use state, or a near ready-to-use state, whereby an end-user may use the product as-is or with addition of a liquid (e.g., water) to bring the product to a useable state. That is, suitable prefabricated products of the invention are not added with any additional ingredient or constituent that would adversely affect the properties, characteristics, and performance for which such prefabricated products are designed for. For instance, the prefabricated products of the invention are not combined with any additional cementitious (i.e., cement or cement-based) materials as the properties, characteristics, and performance of such prefabricated product would be altered.

Suitable prefabricated cementitious products for use in the invention include prefabricated thinset (i.e., mortar), grout, and/or self-leveling underlayment products, particularly those containing large amounts of sand (i.e., sanded prefabricated cementitious products). Each of these prefabricated thinset, grout, and self-leveling underlayment products include various ingredients or constituents within their respective formulations that provide each product with its own unique properties and characteristics for which each product was designed. The various ingredients or constituents of these sanded prefabricated cementitious products may include, for instance, sand, cement, fly ash, PVA powder, and dust free oil. That is, the prefabricated products already contain these ingredients, and such ingredients are not added during the briquetting process of the invention, thereby avoiding changing the formulation of such prefabricated products.

In one or more embodiments of the invention, prefabricated thinset products are employed in the present methods to provide resultant briquetted thinset products. A thinset is a prefabricated mortar product (commonly referred to as "cement mortars") that comprises a combination of cement, finely graded sand, and water retention compounds that allow the cement portion of the product to properly hydrate. Thinsets are primarily used to adhere tile to a substrate, and may contain polymers or other additives to improve adhesion, accommodate movement, and add strength. For instance, prefabricated thinset products may include, but are not limited to, dry-set cement mortars, modified dry-set cement mortars, and improved modified dry-set cement mortars. Each of these different types of prefabricated thinset products have desired performance criteria including, but not limited to, including set time and open time, shear strength to various types of tiles, floor test performance, and sag resistance.

In other embodiments of the invention, prefabricated grout products are employed in the present methods to provide resultant briquetted grout products. A grout is a prefabricated product that comprises a mixture (i.e., factory-prepared mixture) of cement, sand, aggregates, and/or other ingredients to produce a water-resistant, dense, uniformly-colored material. Grout products are primarily used for tile installation to fill joints or the spaces between tiles. While grout products may be provided in unsanded forms (i.e., for filling joints ⅛" in width or less and/or for use with glass tile) and sanded forms (i.e., for filling joints ¹⁄₁₆" (1.5 mm) in width or greater), embodiments of the invention are primarily directed to those prefabricated grout products that include sand. The invention is also suitable for use with unsanded prefabricated grout products. Suitable grout products for use in the invention may include, but are not limited to, high-performance prefabricated grouts that contain latex or other polymers to achieve improved characteristics such as increased bond strength, flexural strength, and lower water absorption for frost resistance. Performance criteria for such prefabricated grout products include, but are not limited to, linear shrinkage, water absorption, compressive strength, tensile strength and flexural strength.

The invention is also suitable for use with prefabricated self-leveling underlayment products. Prefabricated self-leveling underlayments comprise a prepared blend of cement, very finely graded sand, aggregates, and water retention materials that allow the cement to properly hydrate and generate a flowable, fast hardening underlayment that provides flat and level floors. Self-leveling underlayments may be used as flat and level floors prior to installing an overlying layer (e.g., tile, stone, large format porcelain panels, carpet, polyaspartic or epoxy floors coatings, vinyl, wood, and other flooring materials), or they may be used as finished flooring that may be polished, integrally colored or dyed at the surface.

It has been found that known approaches of aggregating and/or briquetting that employ use of adding water, solvents, binders and other agents, and/or combinations thereof, have detrimental effects on prefabricated thinsets, grouts, and/or self-leveling underlayment products. In particular, the particles within these prefabricated products often bind too early (i.e., prior to use), as well as are altered both chemically and physically to detrimentally affect the properties, characteristics, and performance thereof. All of these changes lead to prefabricated products that are not fit for their intended purpose, thereby generating end products (e.g., flooring, laid tile, tiling, grout lines, etc.) having defects, increased failure rates, or actual failures.

Due to high sand amounts within each of the prefabricated thinsets, grouts, and/or self-leveling underlayment products, it has also been found that known approaches of aggregating and/or briquetting employing addition of water, solvents, binders, agents, and/or combinations thereof, do not generate useable briquettes, and in certain instances do not generate briquettes at all. In particular, while prefabricated thinsets, grouts, and/or self-leveling underlayment products may contain cement or a cement-based component, a core ingredient within each of these products is sand. It has been found that prefabricated products having high sand content are difficult to briquette using known techniques, and the present invention provides a solution thereto.

In one or more embodiments the prefabricated thinset, grout, and/or self-leveling underlayment products formed into briquettes in accordance with the invention comprise a mixture or blend of 24 wt. %-80 wt. % sand, 9 wt. % to 49 wt. % cement or cement-based material (e.g., portland cement, calcium aluminate cement and/or gypsum-based cement), 0 wt. % to 9 wt. % fly ash, 0 wt. % to 5 wt. % PVA powder, and 0 wt. % to 3 wt. % dust free oil, whereby all weight % is based on a total weight of the prefabricated product being briquetted or compressed.

In certain embodiments suitable prefabricated thinset products of the invention may have a sand content ranging from 25 wt. %-70 wt. %, preferably from 35 wt. %-65 wt. %, and most preferably from 40 wt. %-55 wt. %. The prefabricated grout products of the invention may have a sand content ranging from 30 wt. %-80 wt. %, preferably from 40 wt. %-70 wt. %, and most preferably from 50 wt. %-65 wt. %. Suitable prefabricated self-leveling underlayment products of the invention may have a sand content ranging from 24 wt. %-74 wt. %, preferably from 34 wt. %-64 wt. %, and most preferably from 39 wt. %-55 wt. %.

In one or more embodiments of the invention it is preferred that the sanded prefabricated cementitious products (i.e., formulations) are compressed or formed into briquettes without the use of water during formation of such briquettes. It has been found in these embodiments that the presence of water or moisture during briquette formation leads to the products being too tightly packed or even binding the product particulates together, both of which undesirably decreases the resultant briquette's ability to fully dissolve in water prior to use thereof. The prefabricated products may also be briquetted/compressed without adding any additional ingredients including, but not limited to, cement, cement-based materials, binders, active agents, stabilizing agents, and the like, thereby avoiding both any additional processing steps and altering the prefabricated products as well as each product's properties, characteristics, and/or performances.

While in one or more embodiments it is preferred that the prefabricated products be briquetted without addition of any added components/ingredients, other embodiments of the invention may include addition of added components/ingredients (i.e., water, cement, cement-based materials, binders, active agents, stabilizing agents, colorants, etc.) to the prefabricated products prior to compression/briquetting. In these embodiments the formulations of the prefabricated products have tolerances that allow for adding components/ingredients to the products prior to compression or briquetting. For instance, it may be desirable to provide additional or enhance existing properties/characteristics of the prefabricated products. The addition of components/ingredients to the prefabricated products, (e.g., prefabricated thinset, grout, and/or self-leveling underlayment products) may also assist in forming the resultant composite block (i.e., briquette).

Figure 2A:
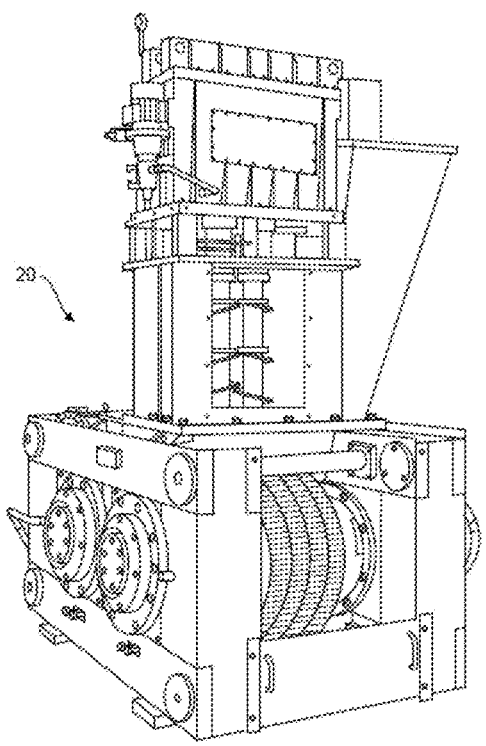
FIGS. 2A and 2B illustrate vertical feed briquette devices suitable for use in one or more embodiments of the invention.
Figure 2B:
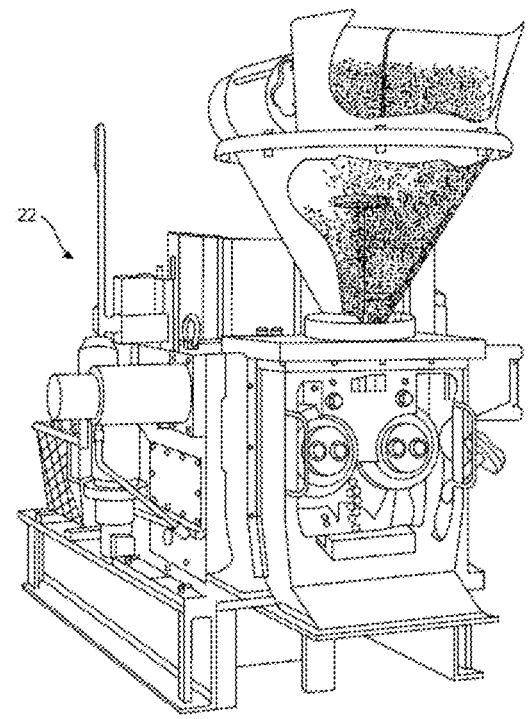
Figure 3:
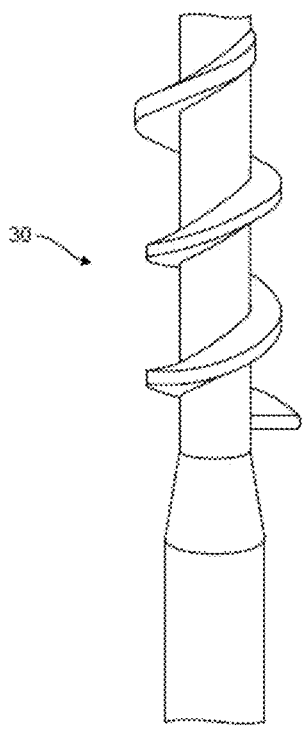
FIG. 3 illustrates a cylindrical feeder screw for use in the briquette devices of FIGS. 1-3B in accordance with one or more embodiments of the invention.

The methods of the invention may be implemented using various compacting or briquetting devices. For instance, FIGS. 1, 2A and 2B illustrate various compacting or briquetting devices suitable for use in the invention. In one or more embodiments the device is a horizontal feed briquetter 10 as shown in FIG. 1, or a vertical feed briquetters 20, 22 as shown in FIGS. 2A and 2B. The briquetter device may include roller compactors that allows for roller briquetting. The use of roller briquetting allows the different thinsets, grouts, mortars, and/or self-leveling mixtures of the invention to be formed into compressed composite blocks (i.e., briquettes), and in certain embodiments without the addition of water and without additional ingredients being added.

In one or more embodiments, referring to FIG. 2B the invention may be performed on a Hosokawa Alpine ARC CS 25 roller compactor 22 having briquetting rows. These briquetting rows may be drum presses comprising egg or egg-shaped molds that compress the prefabricated thinset, grout, and/or self-leveling underlayment products into briquettes. The ARC CS 25 roller compactor may also be provided with a simple screen to collect any residue or uncompacted material. In the invention, the feeding auger in the briquetting device may be replaced with a feeder screw, such as, cylindrical feeder screw 30, that allows the process of roller briquetting to run at a slow speed for controlling both screw speed and roller speed in forming the briquettes 40 of the invention.

In generating the briquettes 40 of the invention, the various thinset, grout, mortar, and/or self-leveling briquettes 40 are formed by controlling and maintaining processing parameters of the cylindrical feeder screw 30 in combination with parameters of the compacting/briquetting rollers. The prefabricated product material may be in a loose powdered form/state when entering the compression/briquetter drum rollers, whereby the screw speed controls the volume of such prefabricated product material entering the drum rollers. The roller speed controls the residency (roll rates and duration) of such prefabricated product material within the drum rollers.

Also controlled and maintained in accordance with the invention are the applied drum roller pressures. The pressure applied to the drum rollers may vary depending upon the size of the desired resultant prefabricated thinset, grout, and/or self-leveling underlayment briquettes. It has been found that controlling screw speed, roller speed and pressures applied to the roller speed generates an applied press force on the prefabricated product material being compressed to provide the resultant briquettes of the invention.

In one or more embodiments, briquetting device pressures of the invention may range from 500 PSI to 15,000 PSI, which in combination with controlling both screw and roller speeds, generates a controlled force on the prefabricated product material ranging from 10 kN to 200 kN (kilonewton) for forming the briquettes of the invention. That is, drum roller PSI is controlled in combination with selecting both material feed rate per product requirements and drum speed per product requirements (e.g., controlling in combination surface speed, cavity size, cavity shape, roller die separation force) to generate briquettes 40 of the invention having high amounts of sand as a core ingredient.

Sizes of the resultant briquettes 40 may vary ranging from small briquettes having dimensions of about (10×12×20) mm to large briquettes having dimensions of about (16×20×30) mm. In various embodiments, the applied briquetting device pressures may also vary for forming smaller briquettes of the invention, whereby pressures may range from 500 PSI to 5,000 PSI, preferably from 1,000 PSI to 2,500 PSI, and most preferably from 1,500 PSI to 2,250 PSI. Also, the applied briquetting device pressures for forming larger briquettes of the invention may vary ranging from 3,000 PSI to 15,000 PSI, preferably from 5,000 PSI to 11,000 PSI, and most preferably from 7,000 PSI to 8,000 PSI.

Figure 4:
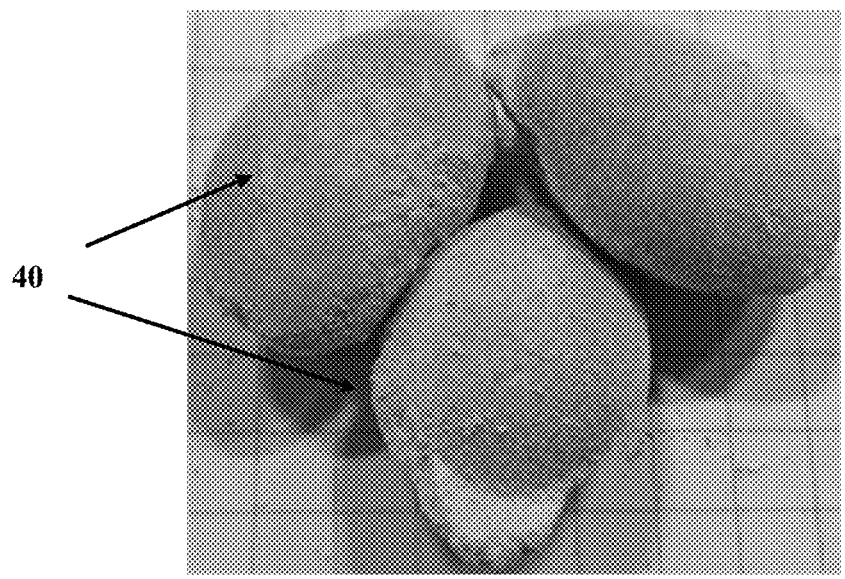
FIG. 4 illustrates prefabricated product briquettes formed in accordance with the various embodiments of the invention.

In accordance with the various embodiments of the invention, referring to FIG. 4, resultant briquettes 40 of the invention comprise a plurality of prefabricated thinset, grout, and/or self-leveling underlayment briquettes 40. The briquettes 40 of the invention are essentially in dust free form, thereby reducing dust particles in use and reducing package (shipping container or bag) sizes. In addition to being dust free, the prefabricated thinset, grout, and/or self-leveling underlayment briquettes 40 are also capable of being transported with little to no segregation allowing for larger quantities to be shipped. The present thinset, grout, and/or self-leveling briquettes 40 provide ease of use and handling as they are easier to pour out of a package (e.g., shipping container or bag) as compared to loose powder forms of the original prefabricated product.

Referring to FIG. 6, and Tables 1 and 2 below, a number of different batches of comparative prefabricated thinset, grout, and/or self-leveling underlayment products (all having high amounts of sand in the product), test runs and briquette compacting processing conditions were performed. These tests were performed using an ARC CS 25 roller having roll types of two (2) rows of almond shaped presses having dimensions of about (14×20×30) mm. The effects of any additives were also tested with respect to the prefabricated product materials.

In accordance with one or more embodiments, the processing conditions of the following examples of the invention include a working width of about 6.4 cm, an accumulator pressure of about 50 bar, a roll speed of about 4 rolls per minute (RPM), with manual dosing and using the cylindrical feeder screw 30 of the invention. In accordance with the invention, the processing conditions further included hydraulic pressures of 70 to 85 [bar], roller amperage of (2×3.1) to (2×5.5) [A], roller torque of (2×2.1) to (2×5.8) [Nm], feeder screw speed of 16 to 37 [rpm], feeder screw amperage of 2.9 to 3.0 [A], and a feeder screw torque of 1.4 to 2.6 [Nm], all of which generated a press force on the prefabricated product material ranging from 50 [kN] to 200 [kN]. These applied press forces formed the briquettes 40 of the invention having high concentrations of sand per briquette, as compared to the other ingredients within such briquette (e.g., the briquette may be composed primarily of sand).

Referring to Tables 1 and 2 below, various prefabricated thinset, grout, and/or self-leveling underlayment product materials were compressed/briquetted as-is (i.e., without adding any additives) in accordance with the processing parameters of the invention. These runs were performed on a B100 compact roller machine having a pocket drawing of B122-5, pocket volume of 1 cc, and number of pockets of 1×32. In Tables 1 and 2, all test runs ("Day 1") were performed based on the processing parameters of the invention whereby the feeder screw speed and roller speed were simultaneously controlled in combination with controlling roller pressures to generate a press force of the high-sand content prefabricated product material that enables formation of a stable briquette that has such high-sand content.

In Table 1, all test data showed sufficient briquette formation in accordance with the invention, with briquettes having sufficient dissolvability. It was found the resultant briquette of sample "C" on Day 1 (which included an additive), resulted in a thinset having altered properties (e.g., weight and density). In Table 2, it was found in test runs on day 2 ("Day 2") and day 3 ("Day 3") that the addition of an additive (i.e., a binder) to the prefabricated grout product actually prevented briquette formation in accordance with the invention, even under maximum screw feed speed and very low roll speed. All other briquettes in Table 2 showed sufficient briquette formation with briquettes having sufficient dissolvability.

TABLE 1

| Test Data-Day 1 ("D1"): | | | | |
|---|---|---|---|---|
| | A-D1 | B-D1 | C-D1 | D-D1 |
| Material | 253 Thinset | 254 | 254 Thinset | PermaColor |
| Loose bulk Density 2 cup(473 cc) = 458 grams | 1.47 | 1.1 | 1.02 | 1.6 |
| Moisture | 0 | 0 | 0 | 0 |
| Binder % | 0 | 0 | 1% to 2% | 0 |
| Feeder Screw Speed | 6 | 5 | 5 | 7 |
| Feeder Screw Amps (4 | +5 | 4.4 | 4 | 5 |
| Roller Speed | 3 | 3 | 3 | 2.5 |
| Roller Amps (4.2 empty) | 7.5 | 4.5 | 4.5 | 4.5 |
| Roller Pressure (1500 lbs Pre-set) (psi) | 2,250 | 2,250 | 2,250 | 2,250 |
| RESULTS | | | | |
| Briquettes Crush Strength | <25 | <25 | <25 | <25 |
| Briquette Weight | 3.8 | 2.6 | 2.7 | 3.3 |
| Briquette Density | 3.8 | 2.6 | 2.7 | 3.3 |

TABLE 2

Test Data-Day 2 ("D2") and Day 3 ("3"):

| | A-D2 | B-2 | C-2 | D-2 | D-3 |
|---|---|---|---|---|---|
| Material | Perma-Color | Perma-Color | Levelex | 253 | 253 |
| Loose bulk Density 2 cup(473 cc) = 458 grams | 1.38 | 1.6 | 1.4 | 1.47 | 1.47 |
| Moisture | 0 | 0 | 0 | 0 | 0 |
| Binder % | 2% | 0 | 0 | 0 | 0 |
| Feeder Screw Speed | 2-7 | 7 | 4 | 6 | 6 |
| Feeder Screw Amps (4 | 4 | 5 | 3.9 | +5 | +5 |
| Roller Speed | 2-7 | 2.5 | 2.5 | 3 | 3 |
| Roller Amps (4.2 empty) | 4.2 | 4.5 | 4.5 | 7.5 | 7.5 |
| Roller Pressure (1500 lbs pre-set) (psi) | 2,250 | 2,250 | 2,250 | 2,250 | 2,250 |
| RESULTS | | | | | |
| Briquettes Crush Strength | No product | <25 | <25 | <25 | <25 |
| Briquette Weight | No product | 3.5 | 3.0 | 3.8 | 3.8 |
| Briquette Density | No product | 3.5 | 3.0 | 3.8 | 3.8 |

In accordance with the various embodiments of the invention, the starting material of the prefabricated product material is in a dry state and has a large amount of dry sand, which makes it difficult to briquette. The processing parameters of the invention enable the formation of prefabricated products have a large amount of dry sand, while providing briquettes that easily break up after addition of water prior to use of such briquettes. That is, the briquettes 40 of the invention are not too tightly compacted which would prevent breaking down of the briquette. The controlled pressures and speeds of the invention generate usable briquettes that break up and form the intended resultant product of such prefabricated product (see, e.g., FIG. 5B).

The briquettes 40 of the invention may have a variety of different shapes and sizes ranging from (10×12×20) mm to (16×20×30) mm, or more or less. The processes of the invention also form resultant briquettes having sizes ranging from 0.125 cubic inches to 2.0 cubic inches. It has been found the size and shape have a role in the viability of the briquettes during storage and transport as well as being a key factor in hydrating the briquetted material. Also, the application or end use of the briquettes may affect the necessary size to meet application requirements.

While not meant to be limiting, various embodiments of the invention are particularly suitable for use with prefabricated thinset, grout, and/or self-leveling underlayments. In these embodiments, processing conditions are provided for forming briquettes of prefabricated thinset, grout, and/or self-leveling underlayment composite blocks (i.e., briquettes) without the addition of additives (e.g., binders, liquids, stabilizers, etc.) to the mixture prior to compression, extrusion or compacting. As the briquettes 40 of the invention are formed without the addition of any additive, the properties and/or characteristics of the starting prefabricated product material (i.e., the prefabricated thinset, grout, and/or self-leveling underlayment products) are not affected or altered.

Figure 5A:
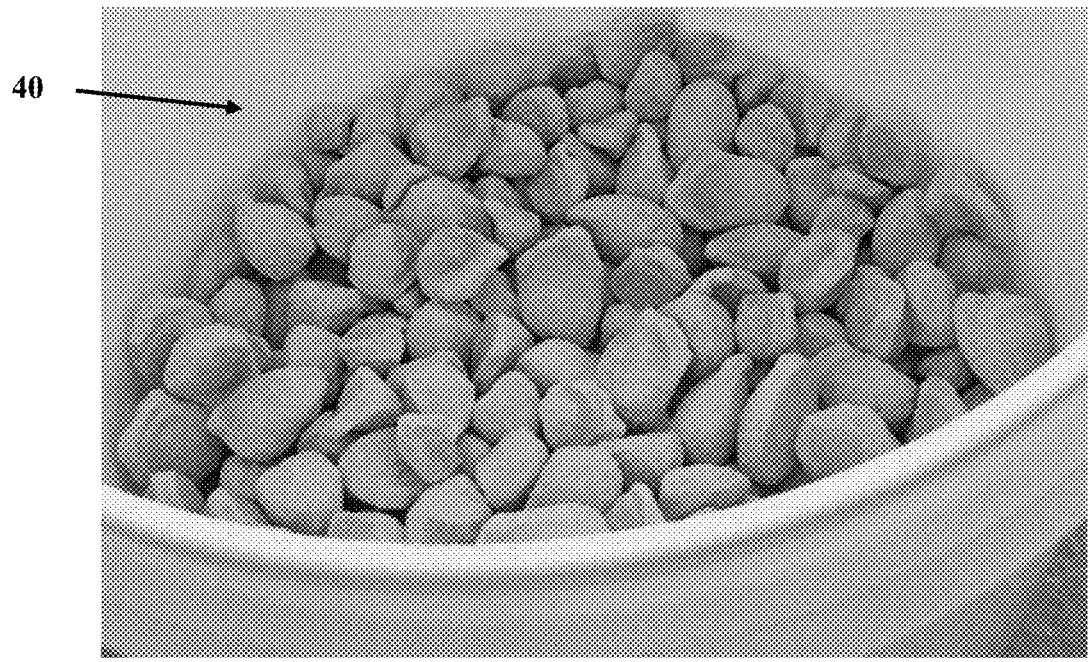
FIG. 5A illustrates prefabricated product briquettes of the invention for use in generating an intended resultant product of such prefabricated product.
Figure 5B:
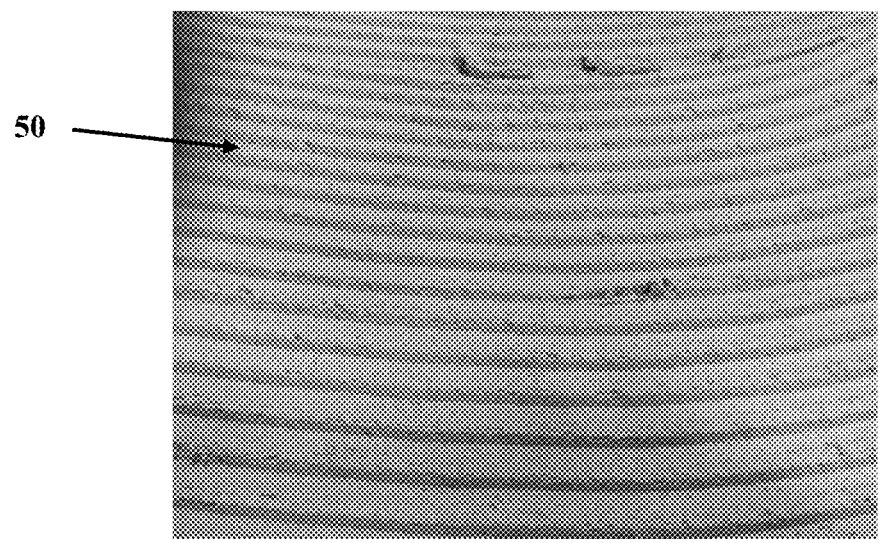
FIG. 5B illustrates an example of the intended resultant product of the prefabricated product described in connection with FIG. 5A.

It should be appreciated that the thinset, grout, and/or self-leveling underlayment briquettes 40 may be formed as compacted or compressed briquettes, pellets, etc. having regular shapes, irregular shapes, or a combination of such shapes. Referring to FIGS. 5A and 5B, the briquettes 40 of the invention may be formed as egg-shaped briquettes. These briquettes 40 may be provided (e.g., poured, deposited, placed, etc.) into a container for forming the intended resultant product of the prefabricated product that was briquetted. Depending on the size and shape of the briquettes, a predetermined amount of liquid (e.g., water) is added to the container to break down the briquettes and form such intended resultant product. For instance, briquettes of the invention may be broken down by mixing such briquettes with water (as shown below) to form a ready to apply thinset, grout, mortar, and/or self-leveling underlayment product.

In one or more embodiments, an end user may mix the briquettes with about 15%-25% of water, based on the volume of the briquettes. Once the water is added to the briquettes, the water and briquettes are allowed to sit for at least one (1) minute to allow the briquettes to soak in the water prior to mixing. The briquettes absorb the water and start to break down or fall apart. This allows the material of the briquettes to separate and be thoroughly hydrated by the water. After the soak time, the briquettes may then be mixed with the water until the briquettes are completely broken down into a smooth, suitable thinset, mortar, grout, and/or self-leveling underlayment material, which is then ready to be applied. For instance, FIG. 5A shows exemplary thinset mortar briquettes 40 for mixing with water to generate the intended resultant thinset mortar of FIG. 5B applied to a substrate.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of forming a prefabricated product composite block comprising:
    providing a compacting tool having a feeder screw and drum rollers;
    feeding only a sanded prefabricated cementitious product in a dry, loose powdered state into the compacting tool;
    controlling feeder screw speed of said feeder screw, roller speed of said drum rollers, and a pressure of said drum rollers within said compacting tool to generate a press force ranging from greater than 140 kN to 200 kN that enables compaction of said dry sanded prefabricated cementitious product;
    compacting said dry sanded prefabricated cementitious product without the use of water using said drum rollers and said press force to fabricate a plurality of sanded prefabricated cementitious composite block briquettes formed by compaction and each having a three-dimensional shape with dimensions ranging from about (10×12×20) mm for small briquettes to about (16×20×30) mm for large briquettes.

2. The method of claim 1 wherein the dry sanded prefabricated cementitious product is compacted in the compacting tool without use of additives selected from the group consisting of water, solvents, binders and combinations thereof.

3. The method of claim 1 wherein the feeder screw comprises a cylindrical feeder screw.

4. The method of claim 1 wherein the sanded prefabricated cementitious product is compacted as-is without adding any additional ingredients thereto.

5. The method of claim 1 wherein the sanded prefabricated cementitious product comprises 24 wt. %-80 wt. % sand, based on a total weight of said sanded prefabricated cementitious product.

6. The method of claim 1 wherein the sanded prefabricated cementitious product comprises a prefabricated thinset containing 25 wt. %-70 wt. % sand, based on a total weight of said prefabricated thinset.

7. The method of claim 1 wherein the sanded prefabricated cementitious product comprises a prefabricated thinset containing 40 wt. %-55 wt. % sand, based on a total weight of said prefabricated thinset.

8. The method of claim 1 wherein the sanded prefabricated cementitious product comprises a prefabricated grout containing 30 wt. %-80 wt. % sand, based on a total weight of said prefabricated grout.

9. The method of claim 1 wherein the sanded prefabricated cementitious product comprises a prefabricated grout containing 50 wt. %-65 wt. % sand, based on a total weight of said prefabricated grout.

10. The method of claim 1 wherein the sanded prefabricated cementitious product comprises a prefabricated self-leveling underlayment containing 24 wt. %-74 wt. % sand, based on a total weight of said prefabricated self-leveling underlayment.

11. The method of claim 1 wherein the sanded prefabricated cementitious product comprises a prefabricated self-leveling underlayment containing 39 wt. %-55 wt. % sand, based on a total weight of said prefabricated self-leveling underlayment.

12. The method of claim 1 wherein the sanded prefabricated cementitious product comprises,
   24 wt. %-80 wt. % sand,
   9 wt. % to 49 wt. % cementitious material,
   0 wt. % to 9 wt. % fly ash,
   0 wt. % to 5 wt. % PVA powder, and
   0 wt. % to 3 wt. % dust free oil,
   wherein all weight % is based on a total weight of said sanded prefabricated cementitious product.

13. The method of claim 1 wherein the pressure of said drum rollers ranges from 500 PSI to 15,000 PSI.

14. The method of claim 1 wherein the pressure of said drum rollers ranges from 1,500 PSI to 2,250 PSI.

15. The method of claim 1 wherein said three-dimensional shapes are selected from regular shapes, irregular shapes, or combinations thereof.

16. The method of claim 1 wherein said composite block briquettes have comprise egg-shaped briquettes.

17. The method of claim 16 wherein said pressure of said drum rollers ranges from 1,000 PSI to 2,500 PSI when forming said small briquettes.

18. The method of claim 16 wherein said pressure of said drum rollers ranges from 5,000 PSI to 11,000 PSI when forming said large briquettes.

\* \* \* \* \*

UNITED STATES PATENT AND TRADEMARK OFFICE
CERTIFICATE OF CORRECTION

| | | |
|---|---|---|
| PATENT NO. | : 11,787,737 B2 | Page 1 of 1 |
| APPLICATION NO. | : 16/571917 | |
| DATED | : October 17, 2023 | |
| INVENTOR(S) | : Stephen R. Grosso, Peter T. Wickenheisser and Paul J. Magda | |

It is certified that error appears in the above-identified patent and that said Letters Patent is hereby corrected as shown below:

In the Specification

Column 2, Line 25, change "501th" to "50kN"

In the Claims

Column 12, Line 22, change "briquettes have comprise" to "briquettes comprise"

Signed and Sealed this
Thirtieth Day of January, 2024

Katherine Kelly Vidal
*Director of the United States Patent and Trademark Office*